United States Patent
Hellum et al.

(10) Patent No.: US 6,650,449 B1
(45) Date of Patent: Nov. 18, 2003

(54) METHOD AND DEVICE FOR NETWORK PROTECTION

(75) Inventors: Pål Langva Hellum, Sandvika (NO); Stefan Nordbo, Olso (NO)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/331,326

(22) PCT Filed: Dec. 12, 1997

(86) PCT No.: PCT/SE97/02086

§ 371 (c)(1), (2), (4) Date: Sep. 21, 1999

(87) PCT Pub. No.: WO98/31119

PCT Pub. Date: Jul. 16, 1998

(30) Foreign Application Priority Data

Dec. 20, 1996 (SE) ................................ 9604706

(51) Int. Cl.[7] .................. G02F 1/00; G02F 2/00; H01S 3/00; H04B 10/00; H04J 14/00
(52) U.S. Cl. ........................ 359/110; 359/119
(58) Field of Search ................... 359/110, 119, 359/117, 135; 370/222, 476

(56) References Cited

U.S. PATENT DOCUMENTS

| 5,179,548 A | 1/1993 | Sandesara |
| 5,321,393 A | 6/1994 | Carlton et al. |
| 5,335,105 A | 8/1994 | Carlton |
| 5,365,510 A | 11/1994 | Nicholson et al. |
| 5,594,581 A | 1/1997 | Alphonsus |
| 5,903,371 A | * 5/1999 | Arecco et al. ............... 359/119 |
| 5,982,517 A | * 11/1999 | Fishman .................... 359/119 |
| 6,046,833 A | * 4/2000 | Sharma et al. ............... 359/119 |

FOREIGN PATENT DOCUMENTS

| EP | 0 677 936 A1 | 10/1995 |
| WO | WO 95/24803 | 9/1995 |

* cited by examiner

*Primary Examiner*—John Tweel (57) ABSTRACT

The present invention relates to a protection switch in a telecommunications system. The protection switch includes at least one line driver connected to an outgoing line, at least one line receiver connected to an incoming line, a protection ring interface including an incoming link and an outgoing link to a protection ring, a line interface including said incoming and outgoing lines, a connection interface including said incoming and outgoing lines connected to a connection board, and three switches. A first switch is connected to the incoming line and to the protection ring, a second switch is connected to the outgoing line and to the protection ring, and a third switch is connected to the protection ring and to the incoming and to the outgoing lines, for re-routing traffic. The invention also relates to a method in which the protective switch is used for line protection and for equipment protection.

15 Claims, 8 Drawing Sheets

METHOD AND DEVICE FOR NETWORK PROTECTION

FIELD OF THE INVENTION

The present invention relates to a method and to a device for protecting a transmission system for protecting the system against line and board failures.

BACKGROUND OF THE INVENTION

It is necessary to ensure in transmission systems, such as telecommunications systems, that the signals transmitted in the system will arrive at the receiver, even though a standard line may be broken or a receiving or transmitting unit is out of operation. A system operator accepts no losses of signals in the transmission system, and consequently it is necessary to take precautionary measures to ensure that the system will function faultlessly even when such faults occur A number of devices and methods are known to this end.

Patent Specifications U.S. Pat. No. 5,365,510, U.S. Pat. No. 5,179,548 and EP-A1 677 936 teach different methods of handling cable breakages in optical transmission systems. Briefly, the protective systems include an additional line in the form of an optical fibre which is connected between the different nodes in the system, in the same manner as the standard line but separated physically therefrom. Communication on the spare line takes place when the standard line has broken at some place or other. In an acute case, when the transmitter unit or receiver unit is out of function, a so-called head is formed on one side of the node and a so-called tail is formed on the other side of the node, therewith disconnecting the node from the network, such that communication will continue between the remaining nodes in the network.

SUMMARY OF THE INVENTION

It is necessary to provide in transmission systems, and then particularly in telecommunications systems, some form of protective device and some form of protective procedure that will ensure that signals transmitted in the system will always reach their intended receiver, irrespective of whether a line breakage occurs or if a transmitter/receiver unit stops functioning.

The present invention addresses a problem as to how this protective device can be implemented in the transmission system in the cheapest and simplest possible manner, and how the combined protection against a line fault and against a board fault can be incorporated in one and the same device.

The aforesaid problem is solved by means of the present invention in that the boards which form the interface against outgoing and incoming lines, the so-called line boards, include a protective switch and are mounted in a protective ring together with a stand-by unit.

Each line board includes a line driver, a line receiver and a number of switches. Each line board includes an associated incoming and outgoing line. These boards include the following interfaces:

- an interface against its corresponding connection board, a so-called connection interface;
- the interface against incoming and outgoing lines, the so-called line interface; and
- an interface against the protective ring, a so-called protective ring interface.

As before mentioned, the protective ring comprises said collection of line boards to be protected, and a stand-by unit which is actuated in the event of a line fault or in the event of a connection board fault. Switching to the stand-by unit can be controlled by a central monitoring unit mounted in a magazine or in the stand-by unit.

The stand-by unit includes a stand-by line board and a stand-by connection board. A connection board forms the interface against the switching centre or telephone exchange unit in the transmission system and thus includes an interface against this switching centre, the so-called switching centre interface, and a further interface against the line board, the aforementioned connection interface.

When a fault occurs in the transmission system, the line driver will detect the loss of signal, LOS, and can change the states of the switches in the protection switch in coaction with the central unit, such as to switch an appropriate part of the traffic to the stand-by unit.

The protection ring may include means for transmitting a pilot tone or some equivalent signal from the stand-by connection board, for monitoring the protection ring.

Thus, the intention of the present invention is to combine protection against line faults and board faults in one single device that includes the protection ring and the protection switches.

The present invention has the advantage of being user-friendly and flexible.

Another advantage afforded by the present invention is that it does not require the use of one card to remedy a line fault and another card to remedy a board fault in one and the same transmission system.

Another advantage is that the present invention does not require a spare line for each line board.

Still another advantage is that each line board in the protection ring can be a stand-by line board.

Yet another advantage is that the protection ring can be monitored via a so-called pilot tone that will not interfere with traffic in the system.

The invention will now be described in more detail with reference to preferred embodiments thereof and also with reference to the accompanying drawings.

DESCRIPTION OF PREFERRED EMBODIMENTS

Figure 1:
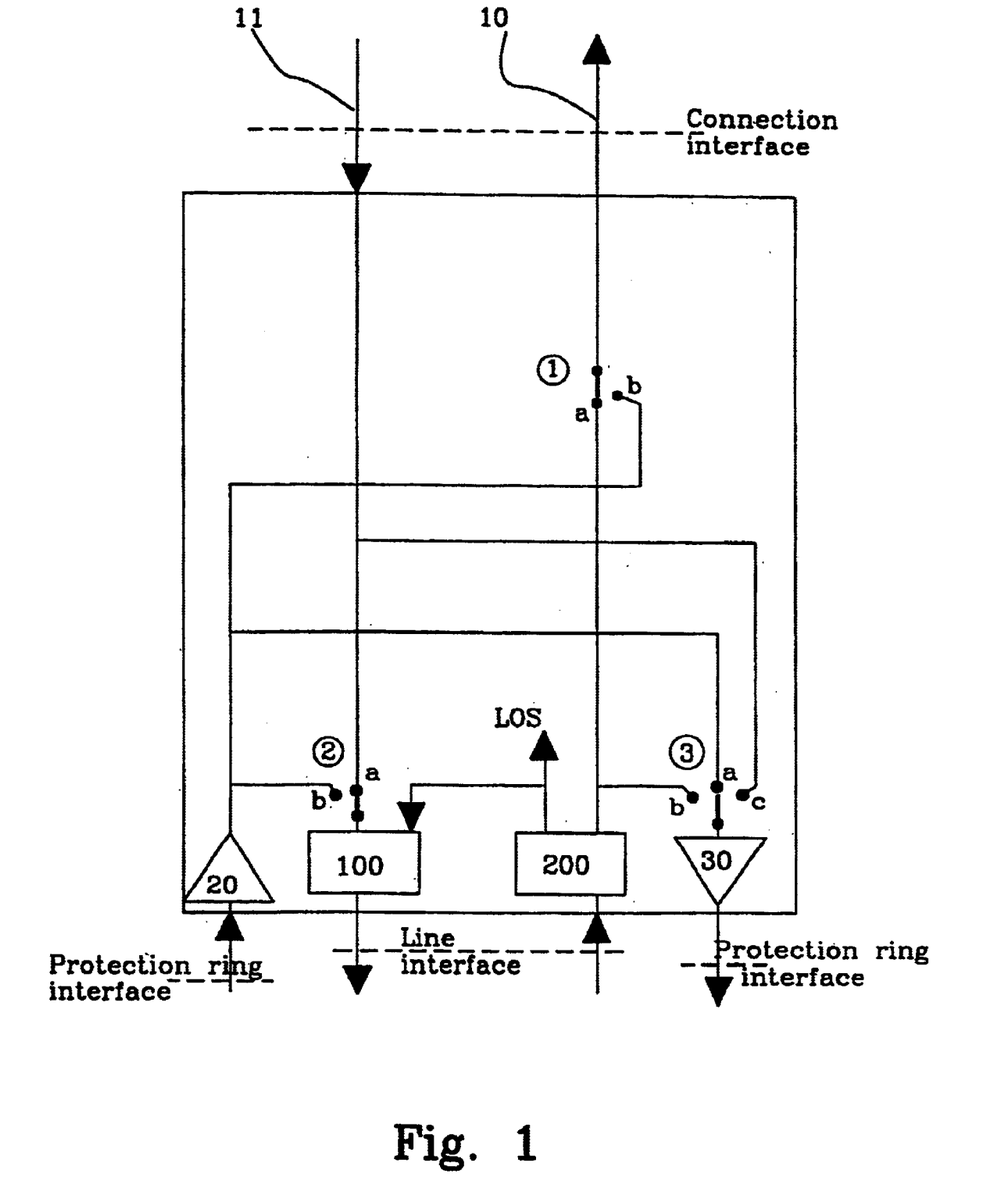
FIG. 1 illustrates an inventive protection switch.

FIG. 1 illustrates one embodiment of an inventive protection switch. The protection switch includes three switches 1, 2 and 3, a line driver 100, a line receiver 200 and a pair of amplifiers 20 and 30. The protection switch also includes an interface against a connection board, a so-called connection interface, an interface against a so-called protection ring, a so-called protection ring interface, and an interface against an incoming line 10 and an outgoing line 11, a so-called line interface. The protection ring interface includes a link incoming to the line board and a link outgoing from said line board. The connection interface and the line interface include an incoming line 10 and an outgoing line 11.

The switches 1 and 2 are able to take two different states or positions, i.e. state a and state b. Switch 3 can take three different states or positions, state a, state b and state c. Switch 1 is connected to the incoming line 10 and to the protection ring. Switch No. 2 is connected to the outgoing line 11 and to the protection ring. Switch No. 3 is connected to the protection ring, to the incoming line 10 and to the outgoing line 11.

When switch 1 is in state a, switch 2 is in state a and switch 3 is in state a, the incoming and outgoing links in the protection ring are mutually connected, i.e. the protection ring will not influence other traffic.

When switch 1 is in state b, switch 2 is in state a and switch 3 is in state c, the incoming link of the protection ring is connected to the incoming line 10, and the outgoing line 11 is connected to the outgoing link of the protection ring.

When switch 1 is in an arbitrary state, switch 2 is in state b and switch 3 is in state b, the incoming link on the protection ring will be connected to the outgoing line 11 and the incoming line 10 will be connected to the outgoing link on the protection ring.

The line driver 100 can either transmit on the link incoming from the protection ring interface or on the line 11 outgoing from the connection interface. The line receiver 200 can either transmit on the line 10 incoming to the connection interface or on the link outgoing to the protection ring interface.

The line receiver circuit 200 is adapted to detect faults in the network, Loss Of Signal, LOS. In the event of a network malfunction, for instance a cable breakage or transmitter/receiver fault, a signal is sent to the central unit and also to the line driver.

Each of the protection switches is mounted on a respective line board belonging to a specific incoming line 10 and a specific outgoing line 11.

Figure 2:
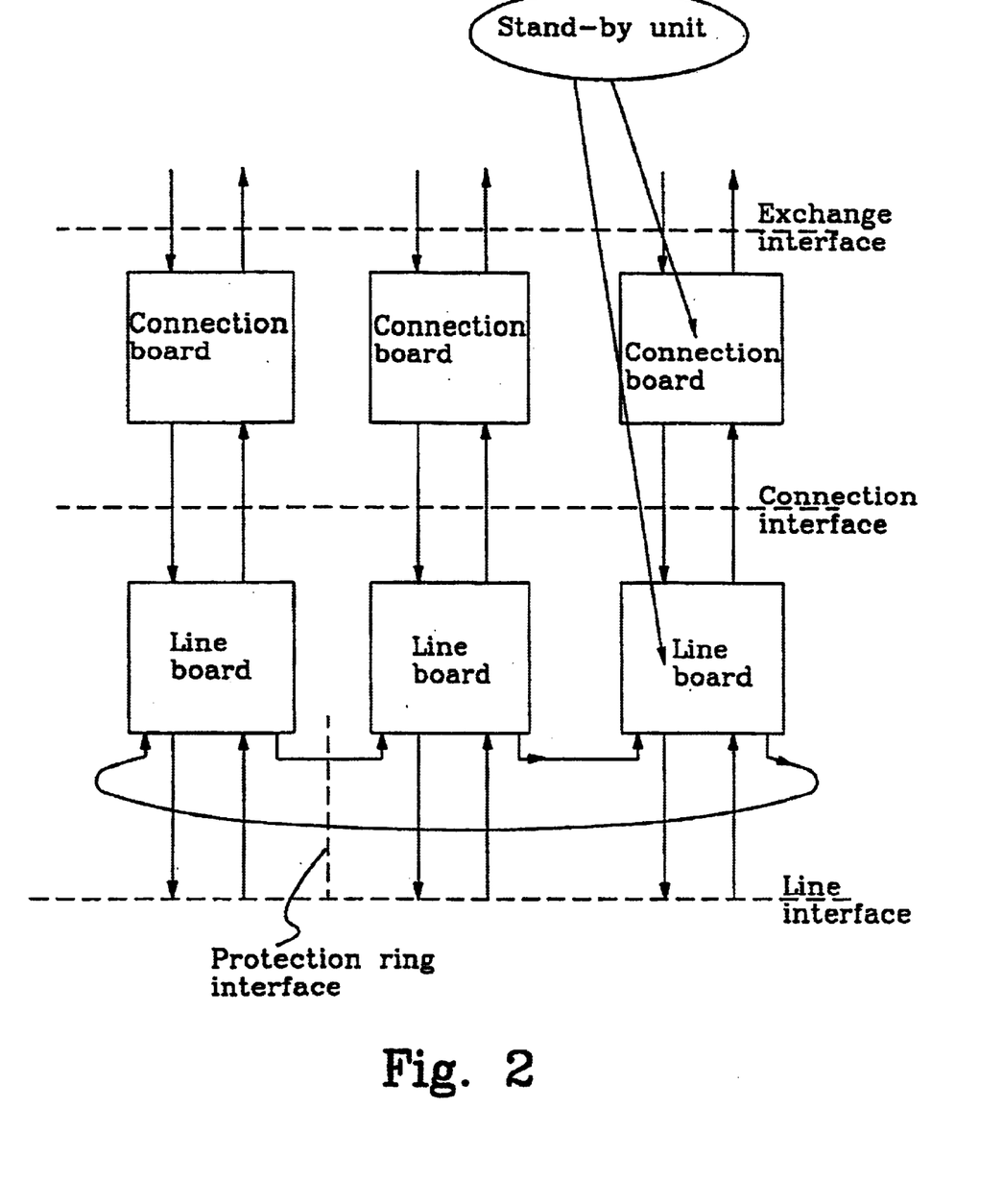
FIG. 2 illustrates a line switching centre or exchange unit interface module that includes a protection ring that includes a number of line boards in accordance with the invention.

FIG. 2 illustrates a line/exchange interface module that includes three connection boards and one of the line boards from a so-called stand-by unit. The coupling boards include a so-called exchange interface. Each of the connection boards is connected to corresponding line boards via a respective incoming line 10 and outgoing line 11. As before mentioned, the interface between the line board and the connection board is called the connection interface. All line boards including the stand-by unit are connected together in the protection ring. When a line breaks, either the incoming line 10 or the outgoing line 11, or a transmitter/receiver unit is out of function, this is detected by the line receiver 200 in the protection switch, wherewith said line receiver sends a signal to the central unit which, in turn, orders switching from either the standard line board to the stand-by line board or from the standard connection board to the stand-by connection board, depending on the nature of the fault, ile. Whether the fault is a line fault or a transceiver fault.

Figure 3:
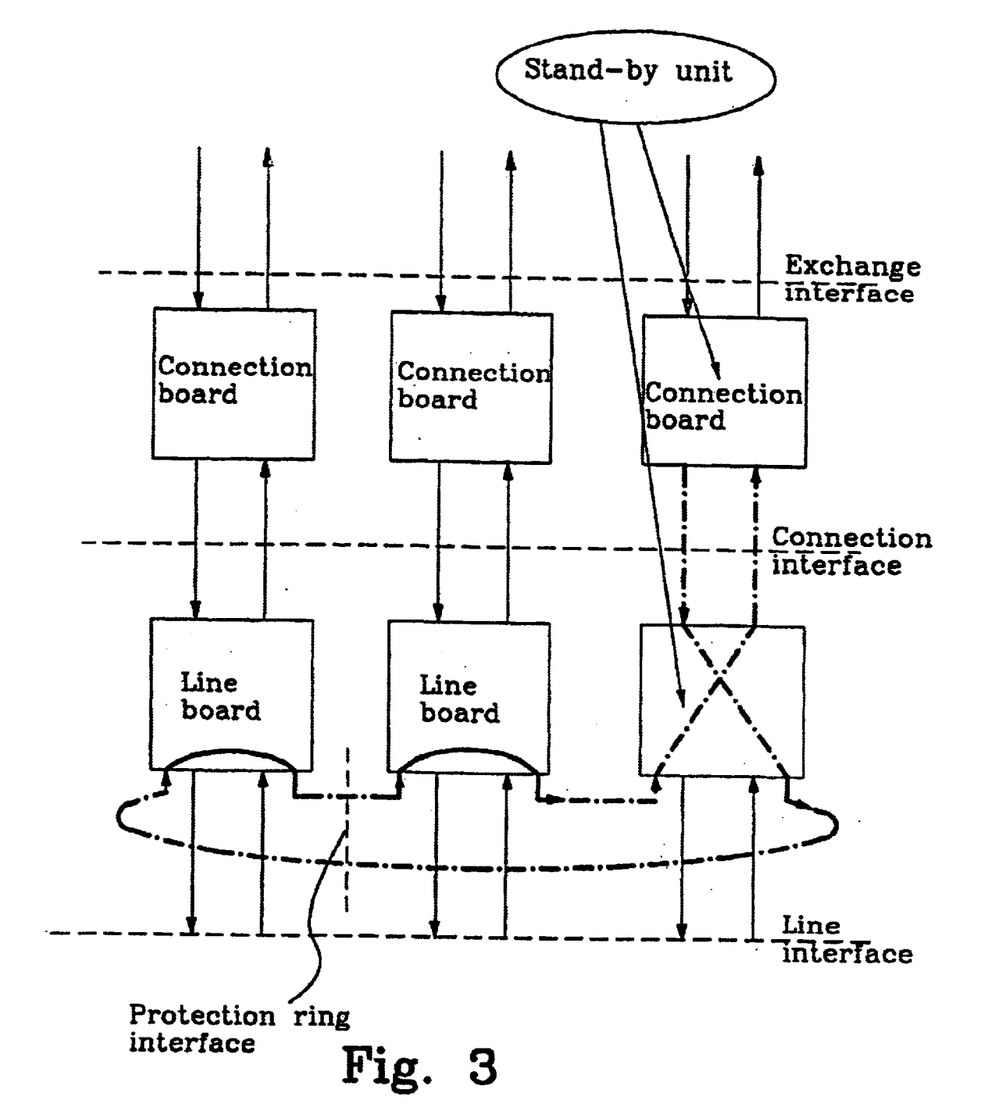
FIG. 3 shows the line/exchange interface module with the protection ring in normal traffic.

FIG. 3 illustrates the line/ex change inter face module in normal traffic, i.e. in the so-called normal state of the protection ring. In this state of the module, a so-called pilot tone can be sent from the connection board in the stand-by un it so as to monitor the protection ring. When there is no fault on the protection ring, the pilot tone will return to the stand-by unit, whereas if there is a fault on the protection ring, the pilot tone will not return to the stand-by unit. A fault message can be sent to the central unit to the effect that a fault has occurred in the protection ring and that remedial action should therefore be taken. The pilot tone monitoring the protection ring can be sent simultaneously with other traffic on standard lines 10, 11, without disturbing the traffic. The stand-by unit is constantly available as a substitute for either the line board or the connection board. Each connection board and line board may be designed as a stand-by unit.

Figure 4:
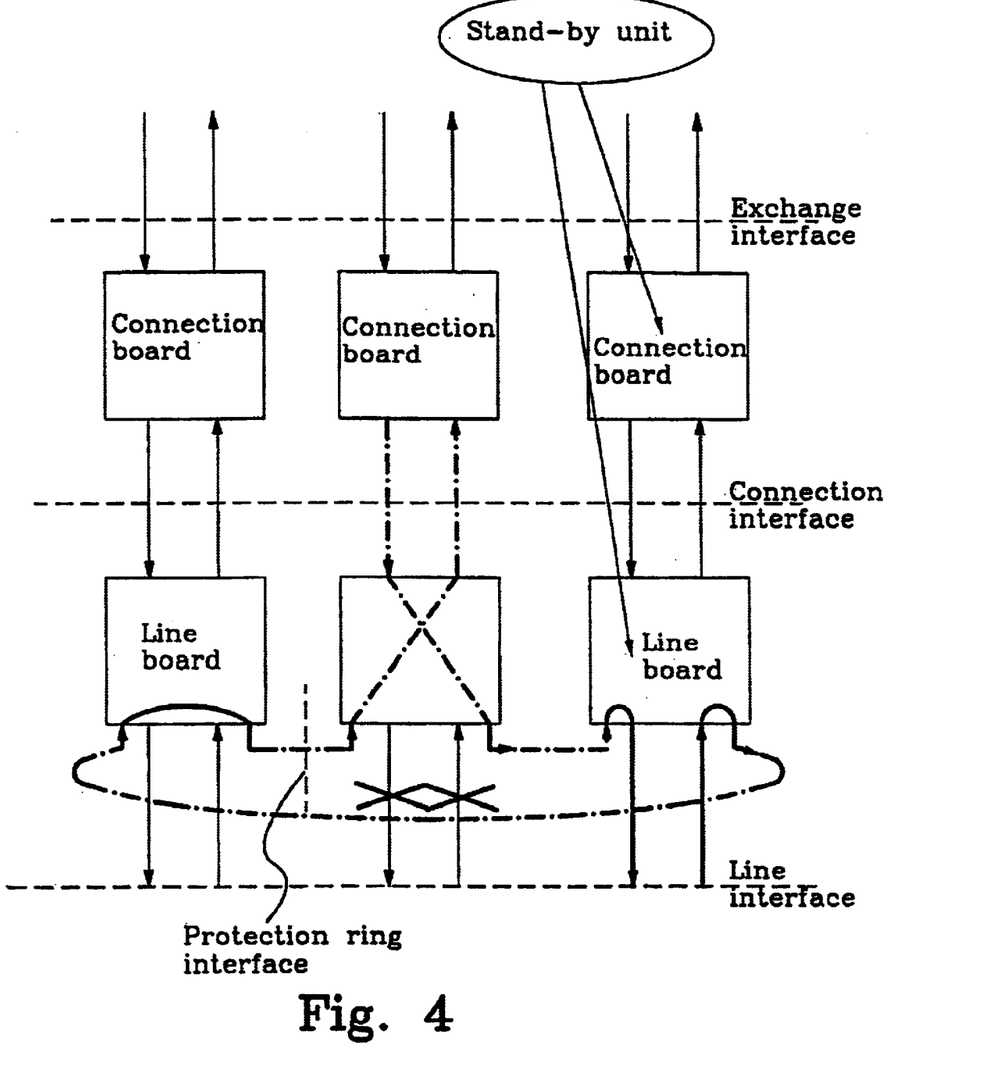
FIG. 4 shows the line/exchange interface module with the protection ring in the case of a line fault.

FIG. 4 shows the line/exchange interface module with a line fault at the line interface adjacent a line board, which is designated x. The line board x belonging to the broken line is here replaced with the stand-by line board. Traffic outgoing on the broken line then passes from the standard connection board through the standard line board to the stand-by line board via the protection ring, and from there onto the stand-by line. Incoming traffic on the broken line is switched to the stand-by line and to the stand-by line board and through the standard line board to the standard connection board, via the protection ring.

This switching process is controlled via a central unit, which receives signals from the line driver and line receiver of the line board carrying information as to which switches 1, 2, 3 shall be switched and the states or positions to which said switches shall be switched.

Figure 5:
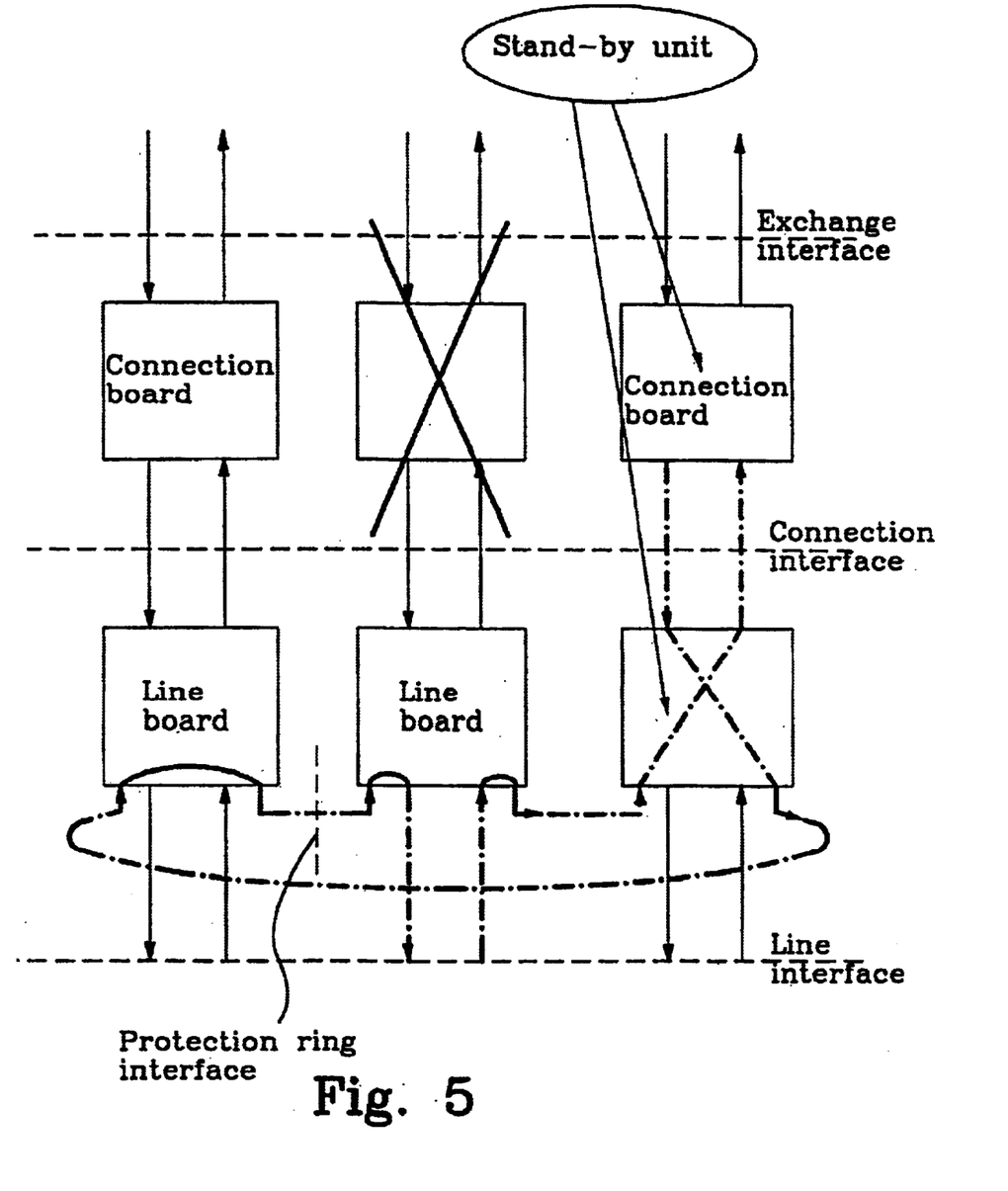
FIG. 5 shows the line/exchange interface module with the protection ring in the event of a board fault.

FIG. 5 shows the line/exchange interface module with a transceiver fault in a connection board, here designated connection board x. The stand-by connection board has replaced the malfunctioning standard connection board in the illustrated case. Traffic outgoing from the stand-by connection board passes through the stand-by line board to the standard line board via the protection ring, and then passes out on the standard line. Incoming traffic from the standard incoming line 10 the standard line board then passes the stand-by line board via the protection ring, and from there to the stand-by connection board.

The switching process is effected via a central unit also in this case, said central unit receiving from the own monitoring of the connection board information signals that inform the central unit which switches 1, 2, 3 shall be switched and the positions or states to which said switches shall be switched.

Figure 6:
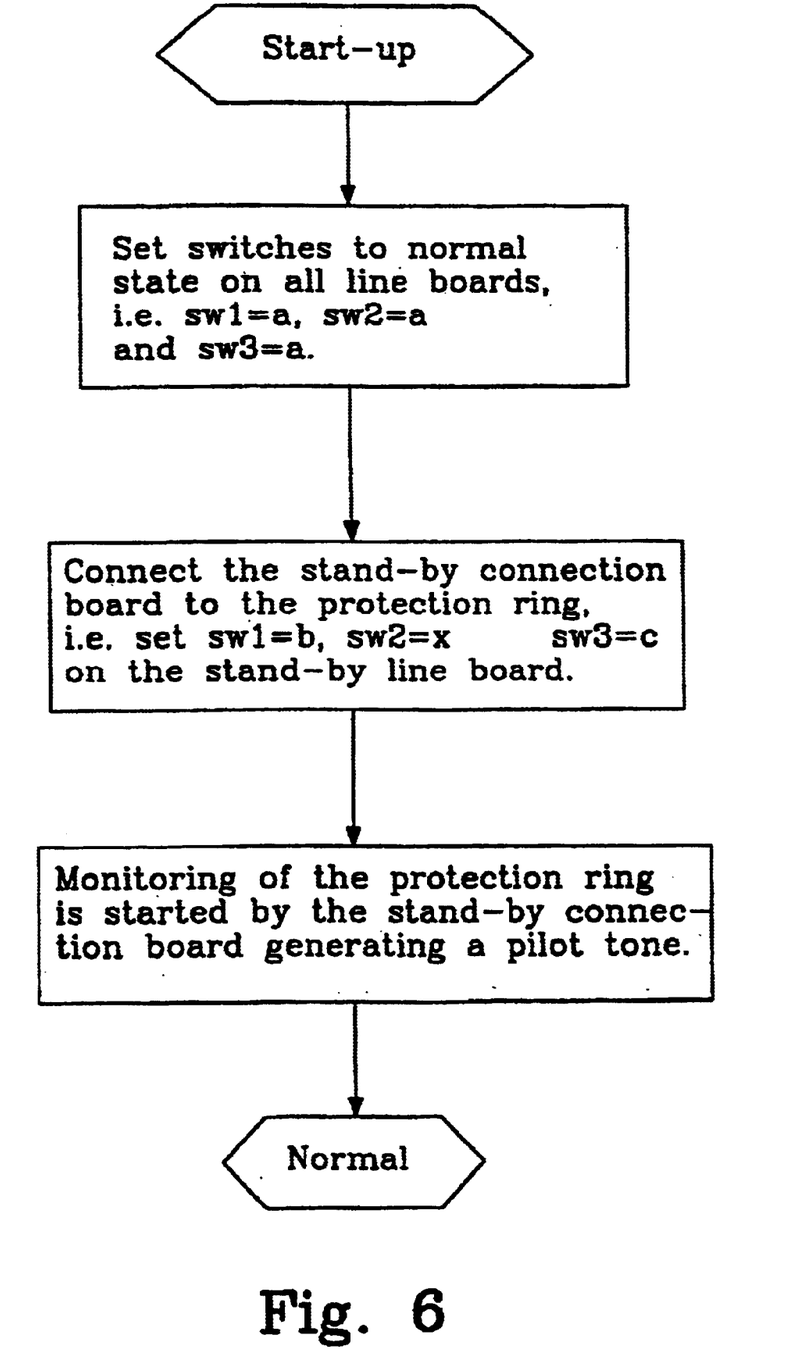
FIG. 6 is a flowchart illustrating the start-up of the inventive protection ring.

FIG. 6 is a flowchart that illustrates the protection ring start-up procedure. The first stage of the start-up procedure is to place all switches in the protection switch on the line board to their respective so-called normal states. Thus, all switches, i.e. switch 1, 2 and 3 in the protection switch in FIG. 1, will take position a. With the switches in this state, only the line board is connected to the protection ring. The next stage is therefore to connect the stand-by connection board to the protection ring. This is achieved by switching switch 1 to state b, switch 2 to state a and switch 3 to state c on the stand-by line board.

Finally, monitoring of the ring is commenced by the stand-by connection board generating a pilot tone, or signal, having similar properties and sending the pilot tone in the closed protection ring. When no breakages are present in the protection ring, the pilot tone will return to the connection board. On the other hand, if the pilot tone fails to return to the connection board, this indicates a break somewhere in the ring.

In this mode, the protection ring adopts a normal state in which the stand-by unit is constantly arranged to replace a corresponding standard board and line, wherein monitoring of the protection ring takes place at the same time as traffic flows on the incoming standard lines 10 and the outgoing standard lines 11.

Figure 7:
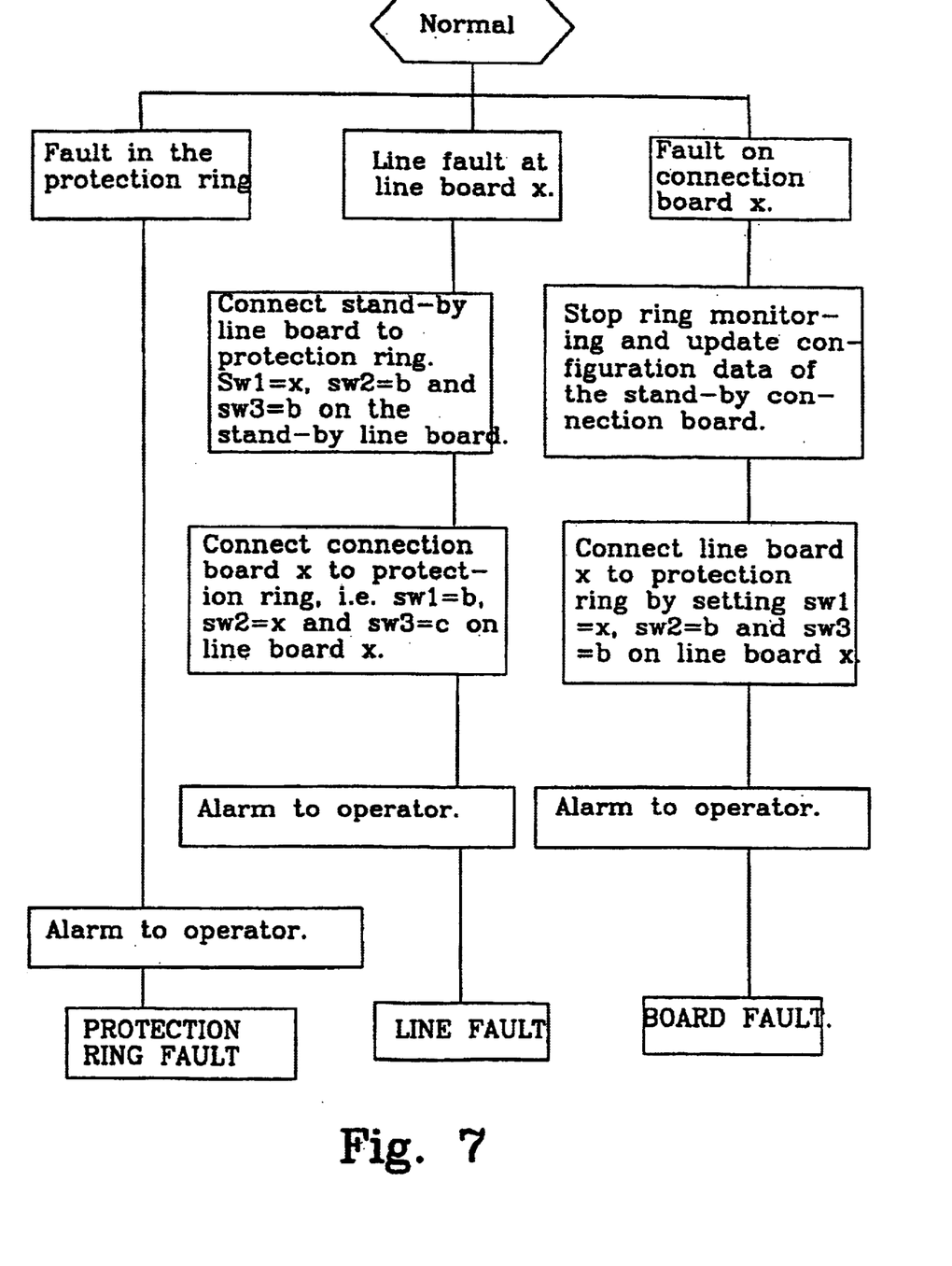
FIG. 7 is a flowchart illustrating activation of the protection ring in conjunction with different types of fault.

The procedure illustrated in FIG. 7 begins from the terminating stage in FIG. 6, i.e. the stage in which no faults were discovered and in which the protection ring operates in its normal state.

In the event of a fault in the protection ring, the stand-by connection board senses the loss of the pilot tone transmitted in the protection ring. The stand-by connection board sends to the central unit a signal to the effect that a fault has occurred in the protection ring. The central unit brings to the attention of an operator the fact that a fault has occurred on the protection ring and that some form of repair must be made.

In the event of a line fault at arbitrary standard line board, which is again designated x, that is to say a standard incoming or outgoing line is faulty after the line board x, the line interface of the stand-by line board is connected to the protection ring. This is effected by setting sw1 to state or position y, sw2 to state or position b and sw3 to state or position b on the stand-by line board. State or position y indicates that the switch is able to take an arbitrary position or state. The standard connection board is then connected to the protection ring, by setting sw1 in state or position b, sw2 in state or position y and sw3 in state or position c on the standard line board x. Finally, a signal to the effect that a line fault has occurred is sent from the standard line board x to the operator, via the central unit.

In the event of a fault on the transceiver unit in any one of the standard connection boards, which is also designated connection board x, the first step in the process is to stop monitoring of the protection ring, by switching-off the pilot tone. This is followed by updating the configuration data of the stand-by connection board, in other words in the event of a fault, the central unit or some other unit having the same function must select another traffic route. Line board x is then connected to the protection ring, by setting switch 1 to position or state y, setting switch 2 to position or state b and setting switch 3 to position or state b. Finally, there is sent to the operator an alarm signal indicating that a fault has occurred on the connection board x in the line/exchange interface module.

Figure 8:
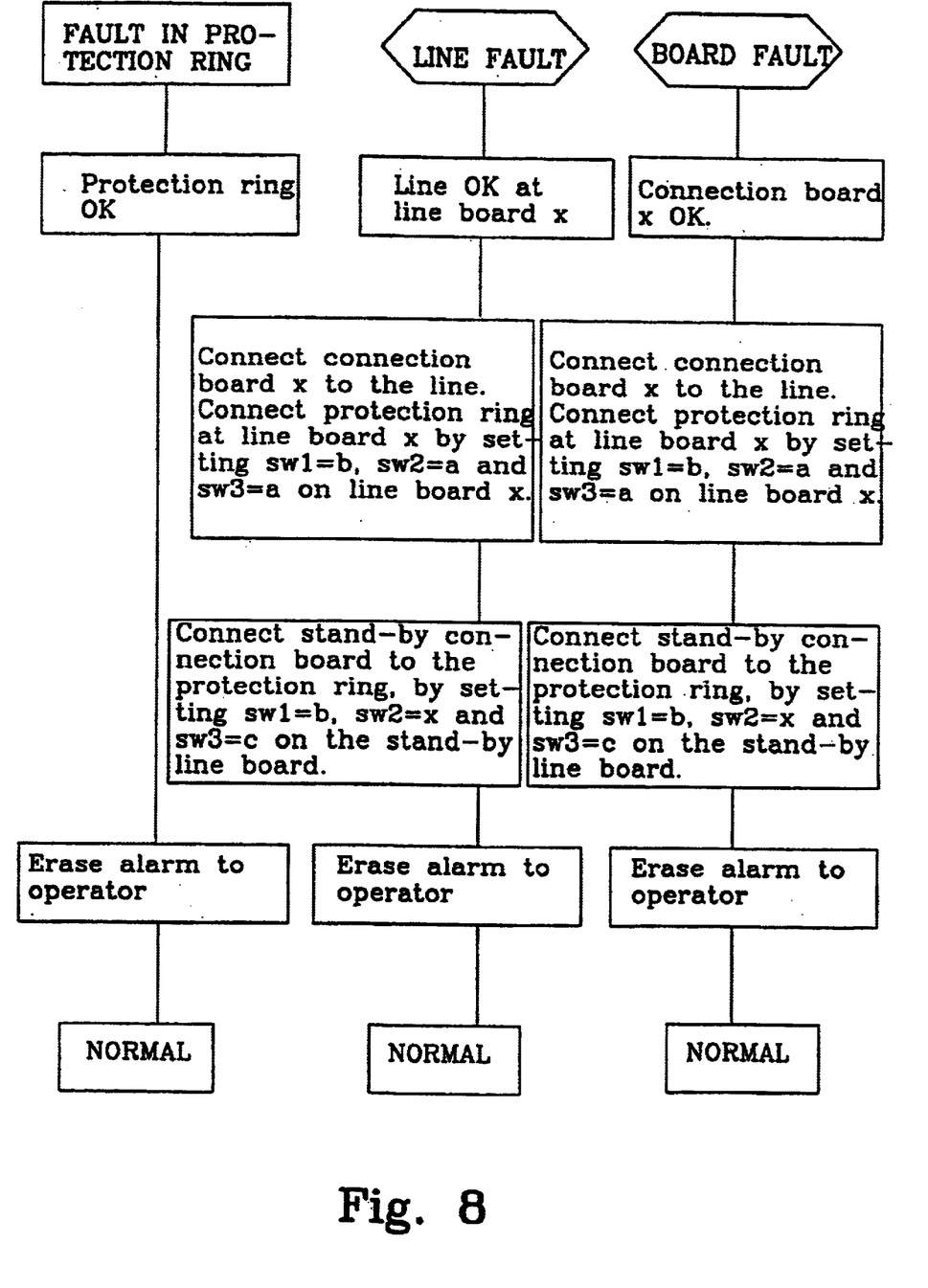
FIG. 8 is a flowchart illustrating deactivation of the protection ring in respect of different types of fault.

FIG. 8 is a flowchart which describes restoration to a normal state subsequent to having repaired a ring fault, line fault or a board fault.

Once having repaired the protection ring, all that is required is for a message to be sent to the operator to the effect that the protection ring has been restored, whereupon the operator can erase the alarm.

After having repaired a line fault adjacent the line board x or after having repaired the connection board x, the operator is informed that the line or the connection board has been repaired. The same procedures are then carried out, irrespective of whether the fault was a line fault or a connection board fault. The connection board x is first connected to a standard line. The protection ring is then connected to the line board x, by setting switch 1 to its state or position a, setting switch 2 to its state or position a and setting switch 3 to its state or position a, i.e. setting all switches 1, 2, 3 to their respective normal states. The stand-by connection board is then connected to the protection ring, by setting switch 1 to its state or position b, setting switch 2 to its state or position y and setting switch 3 to its state or position c by the stand-by line board. Finally, the alarm to the operator is erased.

It will be understood that the invention is not restricted to the aforedescribed and illustrated embodiments thereof, and that modifications can be made within the scope of the following claims.

What is claimed is:

1. A protection switch in a telecommunications system, characterized in that the protection switch is arranged with at least one line driver connected to an outgoing line, at least one line receiver connected to an incoming line, one protection ring interface that includes an incoming link and an outgoing link to a protection ring, a line interface that includes said incoming and said outgoing lines, a connection interface that includes said incoming and said outgoing lines connected to a connection board, and three switches, of which a first switch is connected to the incoming line and to the protection ring and of which a second switch is connected to the outgoing line and to the protection ring and of which a third switch is connected to the protection ring and to the incoming and the outgoing line for re-routing traffic.

2. A protection switch according to claim 1, characterized in that the line driver in the protection switch is designed to detect a Loss Of Signal, LOS, from different interfaces and functions to distinguish a line fault from a connection board fault and to set the switches (1, 2, 3) to appropriate states such as to sustain the through-put of traffic together with a central unit.

3. A line board in a telecommunications system, characterized in that the line board includes a protection switch which has at least one line driver connected to an outgoing line, at least one line receiver connected to an incoming line, a protection ring interface that includes an incoming link and an outgoing link to a protection ring, a line interface that includes said incoming and outgoing lines, a connection interface that includes said incoming and outgoing lines connected to a connection board and three switches, of which a first switch is connected to the incoming line and to the protection ring, of which a second switch is connected to the outgoing line and to the protection ring, and of which a third switch is connected to the protection ring and to the incoming and the outgoing line for re-routing of traffic.

4. A line board in a telecommunications system according to claim 3, characterized in that the line driver in the protection switch is designed to detect Loss Of Signal, LOS, from different interfaces and is able to distinguish line faults from connection board faults and to switch the switches (1, 2, 3) to appropriate states together with a central unit in accordance with the detected fault, so as to maintain traffic through-put.

5. A protection ring in a telecommunications system, characterized in that the protection ring includes at least one connection board and at least two line boards which are arranged with a protection switch that includes at least one line driver connected to an outgoing line, at least one line receiver connected to an incoming line, a protection ring interface which includes an incoming link and an outgoing link to a protection ring, a line interface which includes the aforesaid incoming and outgoing lines, a connection interface which includes said incoming and outgoing lines connected to a connection board, and three switches of which a first switch is connected to the incoming line and to the protection ring, of which a second switch is connected to the outgoing line and to the protection ring and of which a third switch is connected to the protection ring and to the incoming and outgoing line for re-routing traffic, the connection-board and one of the line boards being included in a stand-by unit, said stand-by unit together with remaining line boards is connected to each other in a ring.

6. A protection ring according to claim 5, characterized in that the line driver in the protection switch is designed to detect Loss Of Signal, LOS, from different interfaces and is able to distinguish a line fault from a connection board fault and to set the switches (1, 2, 3) to appropriate positions in accordance with the detected fault and with the aid of a central unit, so as to maintain traffic through-put.

7. A protection ring according to claim 5, characterized in that the connection board includes a connection interface against the line board, and an exchange interface against an exchange unit in the telecommunications system.

8. A protection ring according to claim 7, characterized in that the arrangement is such that in the event of a loss of signal from the line interface at any standard line board, the protection switches on the line board belonging to the aforesaid line interface and also the protection switches on the stand-by line board will switch traffic from said line board to said stand-by line board via said switches (1, 2, 3).

9. A protection ring according to claim 7, characterized in that the arrangement is such that in the event of a loss of signal from a connection interface at any standard connection board, the protection switches on the line board belonging to said connection board and the protection switches on the stand-by line board will switch traffic from said connection board to said stand-by connection board via said switches (1, 2, 3).

10. A protection ring according to claim 7, characterized in that the stand-by connection board is designed to transmit a pilot tone in the protection ring for the purpose of monitoring said ring.

11. A protection ring according to claim 10, characterized in that the pilot tone can be transmitted in the protection ring without disturbing standard network traffic.

12. A method relating to a telecommunications system which includes at least one connection board and at least one line board that are mutually connected via an incoming line and an outgoing line, characterized by arranging the line board and a stand-by unit in a protection ring, said line board including a protection switch;

detecting in the protection switch a Loss Of Signal, LOS, from different interfaces mounted on the protection switch in the event of a fault in the telecommunications system; and re-routing traffic in the telecommunications system from a central unit connected to the protection switch, by setting switches provided in the protection switch to a state in which faulty parts of the telecommunications system are replaced with necessary parts in the stand-by unit.

13. A method according to claim 12, characterized by setting the switches in the protection switch on the stand-by line board in a state in which the stand-by line board is connected to the protection ring in the event of a line fault; and setting the switches in the protection switch on the line board belonging to the faulty line to a state such that the connection board belonging to said faulty line is connected to the protection ring.

14. A method according to claim 12, characterized by stopping monitoring of the protection ring in the event of a fault on any standard connection board; and setting the switches in the protection switch on the line board belonging to the faulty connection board such that said line board will be connected to the protection ring.

15. A method according to any claim 12, characterized by monitoring the protection ring with the aid of a pilot tone that is transmitted in the protection ring from the stand-by connection board and detected therefrom.

* * * * *